United States Patent [19]

Breikss

[11] 4,151,511
[45] Apr. 24, 1979

[54] DIGITAL CORRELATOR

[75] Inventor: Ivars P. Breikss, Littleton, Colo.

[73] Assignee: Honeywell Inc., Minneapolis, Minn.

[21] Appl. No.: 743,259

[22] Filed: Nov. 19, 1976

[51] Int. Cl.² ............................................. G06F 15/34
[52] U.S. Cl. .................................................. 340/146.2
[58] Field of Search ...................... 340/146.2; 235/181, 235/177, 150.53, 151.34; 364/728, 737, 738, 740, 769

[56] References Cited

U.S. PATENT DOCUMENTS

| | | | |
|---|---|---|---|
| 3,346,844 | 10/1967 | Scott et al. | 340/146.2 |
| 3,646,333 | 2/1972 | Pryor, Jr. | 235/150.53 |
| 3,717,756 | 2/1973 | Stitt | 235/150.53 |
| 3,725,689 | 4/1973 | Kautz | 235/150.53 |
| 3,777,133 | 12/1973 | Beck et al. | 235/181 |
| 3,961,171 | 6/1976 | Freeman | 340/146.2 |

Primary Examiner—Malcolm A. Morrison
Assistant Examiner—Errol A. Krass
Attorney, Agent, or Firm—Charles J. Ungemach

[57] ABSTRACT

A digital correlator compares two digital words a plurality of times. Each time the second digital word is shifted by one additional bit with respect to the first digital word. The results of the various comparisons are stored. The stored results are then searched to find the location of the results indicating the greatest similarity between the bits of the first and second digital words. This location is indicative of the number of bits by which the second digital word is displaced with respect to the first digital word when greatest similarity occurs.

2 Claims, 2 Drawing Figures

DIGITAL CORRELATOR

REFERENCE TO CO-PENDING APPLICATION

Reference is hereby made to a co-pending application by Norman L. Stauffer entitled "Digital Auto-Focus", Ser. No. 696,170 filed June 14, 1976 now U.S. Pat. No. 4,078,171 and assigned to the same assignee as the present application. The digital correlator of the present invention is disclosed but not claimed in this co-pending application.

BACKGROUND OF THE INVENTION

The present invention relates generally to digital circuitry. In particular, the present invention is a digital correlator which performs digital correlation on two digital words.

Digital correlators have found application in a variety of different digital systems. Examples of prior art digital correlators are shown in U.S. Pat. Nos. 3,646,333 by Pryor, Jr.; 3,670,151 by Lindsay et al; 3,717,756 by Stitt; 3,725,689 by Kautz; 3,881,101 by Pederson et al; and 3,942,022 by Stumpf et al.

One application which requires a digital correlator is the digital auto-focus system described in the above-mentioned co-pending application by Norman L. Stauffer. In this auto-focus system, two digital words of equal length are produced by two detector arrays. Signal processing circuitry, including a digital correlator, determines the number of bits by which the second word is displaced with respect to the first word. This number may be used to position the taking lens of a camera.

For purposes of the system described in the Stauffer application, the digital correlator must be relatively simple and low-cost and use a small number of components. The digital correlator cannot be a high cost item, since this would adversely affect the overall cost of the camera into which it will be incorporated.

SUMMARY OF THE INVENTION

The digital correlator of the present inventions correlates first and second digital words and determines the number of bits by which the second word is displaced with respect to the first word. The digital correlator includes comparing means, storing means, control means, and search means.

The comparing means provides a plurality of comparison cycles. During each comparison cycle, the individual bits of the first and second digital words are compared. The results of each comparison cycle are stored in a different location in the storing means.

The control means shift the bits of the second digital word with respect to the first digital word so that the second digital word is displaced by a different number of bits with respect to the first digital word during each comparison cycle.

After the comparison cycles have been completed, the search means searches the stored results to find the location of the results indicating the greatest similarity between the bits of the first and second digital word. This location is indicative of the number of bits by which the second digital word is displaced with respect to the first digital word when the greatest similarity between bits occurs.

DETAILED DESCRIPTION OF THE PREFERRED EMBODIMENT

Figure 1:
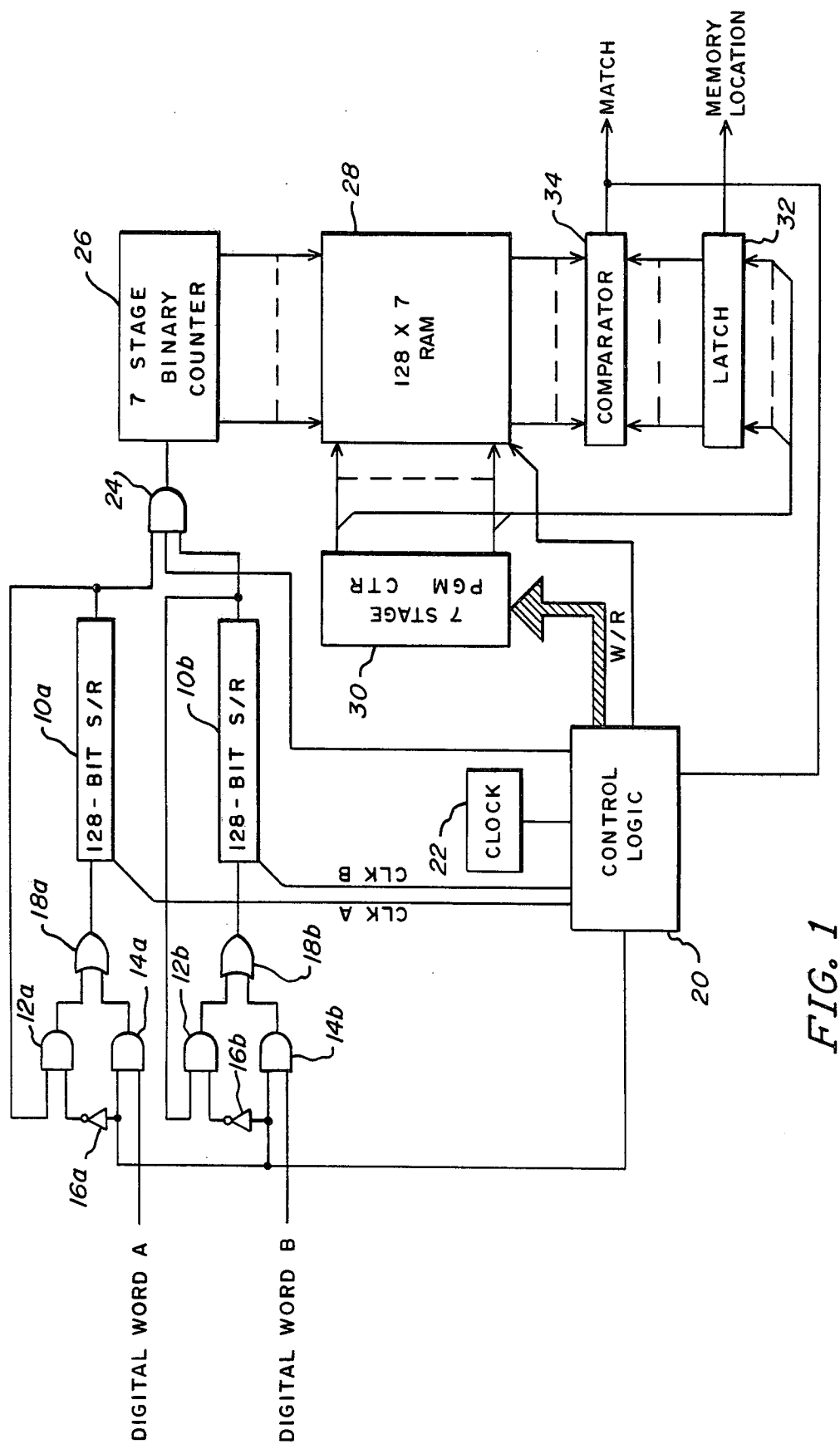
FIG. 1 shows a preferred embodiment of the digital correlator of the present invention.

In FIG. 1, the digital correlator of the present invention repeatedly compares first digital word "A" and second digital word "B" and produces an output signal which is indicative of the number "n", which is the number of bits by which the second digital word B is displaced with respect to first digital word A. In the particular embodiment shown in FIG. 1, the digital correlator performs digital correlation between two words of equal length (128 bits). The specific implementation of the digital correlator will, of course, differ slightly depending upon the length of the two words.

The two digital words are initially shifted into shift registers 10a and 10b. Logic circuits are provided with each shift register to place the shift registers in a RE-CIRCULATE mode after initial loading. These logic circuits include AND gates 12a, 12b, 14a, and 14b; INVERTERS 16a and 16b; and OR gates 18a and 18b.

The two digital words are received by AND gates 14a and 14b. A control signal from control logic 20 is also received by AND gates 14a and 14b. The outputs of AND gates 14a and 14b are inputs to OR gates 18a and 18b, respectively. The control signal from control logic 20 is inverted by INVERTERS 16a and 16b and forms inputs to AND gates 12a and 12b. The outputs of shift registers 10a and 10b are the other inputs to AND gates 12a and 12b, respectively. The outputs of AND gates 12a and 12b are inputs to OR gates 18a and 18b, respectively.

In operation, a logic "1" from control logic 20 enables AND gates 14a and 14b and allows new digital words to be entered into shift registers 10a and 10b. The logic "1" disables AND gates 12a and 12b so that the information presently stored in the shift registers 10a and 10b is not re-entered.

After the digital words have been entered into shift registers 10a and 10b, the control signal from control logic 20 changes to a logic "0", thereby enabling AND gates 12a and 12b and disabling AND gates 14a and 14b. Shift registers 10a and 10b therefore, are in a recirculating mode.

The contents of shift registers 10a and 10b are then shifted (recirculated) in response to the two clock signals, $CLK_A$ and $CLK_B$, supplied by control logic 20. Clock 22 provides synchronizing signals to control logic 20. Each time a logic "1" occurs at the output of registers 10a and 10b simultaneously, AND gate 24 produces an output coincident with the strobe pulse generated by control logic 20. The output pulses of AND gate 24 are counted by binary counter 26.

The number of clock pulses $CLK_A$ and $CLK_B$ correspond exactly to the number of bits in shift registers 10a and 10b. Upon completion of one complete circular shift, the count accumulated in counter 26 is entered into random access memory (RAM) 28 at a location determined by the state of the address counter 30. At the initiation of the correlation sequence, address counter 30 is cleared. This causes the initial memory address and the first entry to occur at the lowest address. The number of counts stored at a particular location in memory 28 is an indication of the similarity between the bits of the first and second digital words during that comparison cycle.

Upon completion of the first circular shift of the contents of shift registers 10a and 10b (i.e., completion of the first comparison cycle), one extra clock pulse is produced at the clock input of shift register 10b. This shifts the contents of shift register 10b by one bit with respect to the contents of shift register 10a. At the same time, address counter 30 is incremented by one. Counter 26 is cleared, and the second circular shifts or comparison cycle of the contents of registers 10a and 10b is commenced, and output pulses at gate 24 are again counted in counter 26. This sequence continues until the number of shifts equals the maximum valve of "n" to be considered. Each time a comparison cycle is completed, the contents of counter 26 are placed in memory 28 at the next higher address obtained by incrementing address counter 30 by one for each completed comparison cycle.

The best correlation is the address of the largest count stored in memory 28 during the comparison cycles. The final step is the determination of this address. The largest number in memory 28 is determined as follows.

Address counter 30 is set to the highest address, which corresponds to all "1's" in address counter 30. This address is then stored in latch 32. Alternatively, the number stored in latch 32 can be derived from a source other than address counter 30. What is required is that the number stored in latch 30 initially be as high as the highest count possibly contained in memory 28 (i.e., all "1's"). The number in latch 32 must be decremented by one each time a complete check of memory 28 has found no match. Address counter 30 is a convenient means for providing the number and decrementing the number.

After the highest count is stored in latch 32, address counter 30 is sequentially decremented to zero. All locations in memory 28 are addressed in sequence and are compared to the contents of latch 32 by comparator 34. If any of the locations in memory 28 contain all "1's", comparator 34 issues an output indicating a match has occured. At this point the correlation process is stopped, and the particular address contained in address counter 30 at that time is entered into latch 32. This address corresponds to the number "n".

If no match is found to the highest count, address counter 30 is decremented by one from its previous highest count and this count is stored in latch 32. The address countdown and comparison is then repeated. The process of decrementing the address and comparing the contents of memory 28 to contents of latch 32 continues until a match is found. At this point, the correlation process is concluded and comparator 34 provides a "Match" output. This particular memory address at which the match occurred is the number "n", control logic 20 causes the address to be entered into latch 32 when it receives the "match" output from comparator 34. The outpuut of latch 32 represents the number "n".

Figure 2:
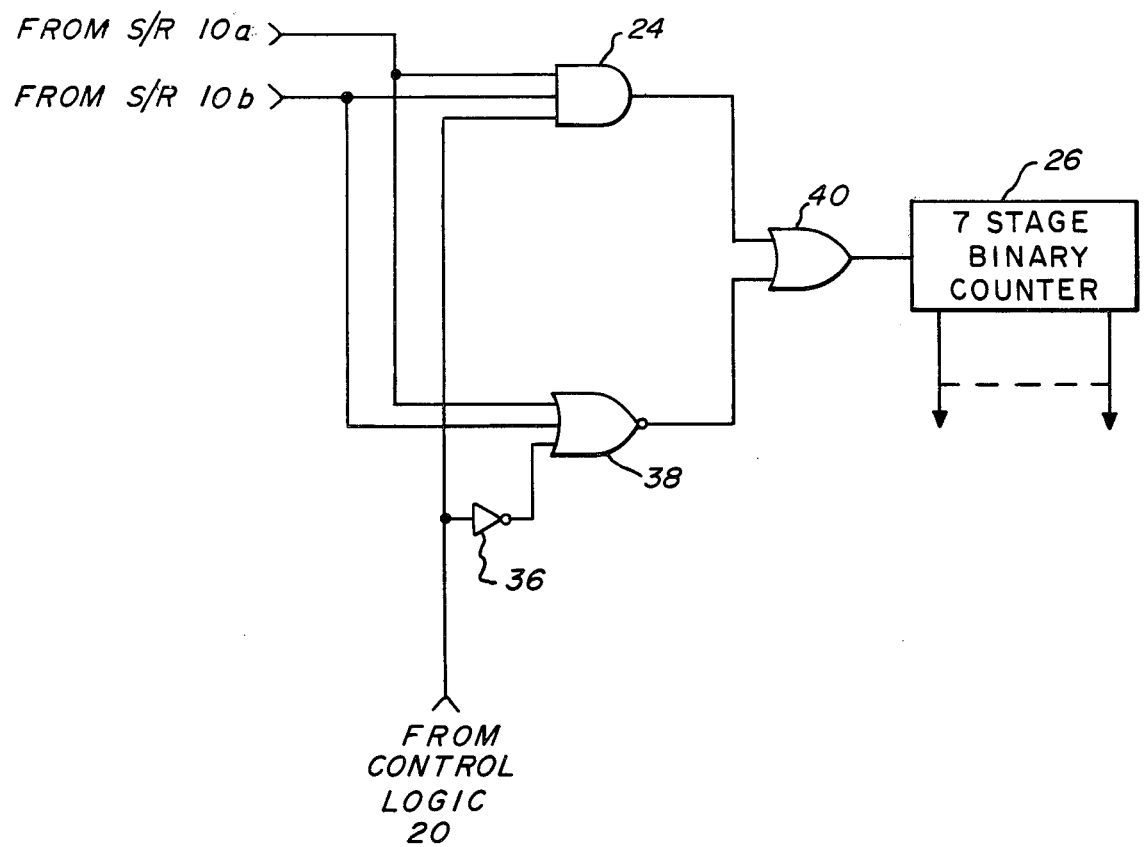
FIG. 2 shows an alternative embodiment of the comparing means used in the digital correlator of the present invention.

FIG. 2 shows a modification of a portion of the digital correlator of FIG. 1. In particular, FIG. 2 shows modification to be comparing means used in the digital correlator of FIG. 1.

As previously described, AND gate 24 of FIG. 1, together with counter 26, form the comparing means which compare the individual bits of the first and second digital words. The counts which are stored occur only when the bits of both the first and second words are "1".

In the modification of the comparing means shown in FIG. 2, a count is produced if the two bits are either both "1" or both "0". The embodiment of FIG. 2 includes AND gate 24 and binary counter 26, plus inverter 36, NOR gate 38, and OR gate 40.

As in FIG. 1, the outputs of shift registers 10a and 10b are applied, together with the strobe pulse from control logic 20, to the inputs of AND gate 24. The output of AND gate 24 is "1" only when all three inputs are "1". In addition, however, the outputs of shift registers 10a and 10b are applied to the inputs of NOR gate 38 together with the strobe pulse which has been inverted by inverter 36. The output of NOR gate 38, therefore, is a "1" if all three inputs are "0".

OR gate 40 applies a "1" to binary counter 26 whenever the output of either AND gate 24 or NOR gate 38 is one. The total count in counter 26, therefore, represents the number of times that the bits from the two digital words are identical, whether they are both "1" or both "0".

In conclusion, the digital correlator of the present invention performs correlation on two digital words with relatively small number of electrical components. While this digital correlator is of particular use in a digital auto-focus system of the type described in the previously mentioned co-pending patent applicaton by Norman L. Stauffer, it has application to many other digital systems as well.

The present invention has been described with reference to preferred embodiments. It will be understood, however, by those skilled in the art that changes in form and detail may be made without departing from the spirit and scope of the invention.

The embodiments of the invention in which an exclusive property or right is claimed are defined as follows:

1. A digital correlator for correlating first and second digital words, the digital correlator comprising:
   comparing means for providing a comparison of individual bits of the first and second digital words during each of a plurality of comparison cycles and for providing a correlation signal each time a correlation occurs;
   storing means for storing a number indicative of the number of correlation signals of each comparison cycle at a different location;
   control means for shifting the bits of the second digital word with respect to the first digital word so that the second digital word is displaced by a different number of bits with respect to the first digital word during each comparison cycle; and
   search means for searching the stored numbers to find the location of the number indicating the greatest similarity between the bits of the first and second digital words, the location being indicative of the number of bits by which the second digital word is displaced with respect to the first digital word when greatest similarity occurs, said search means including (1) latch means for storing numbers therein; (2) comparator means for comparing the number stored in the latch means with the stored numbers in the storing means; (3) decrementing means for decrementing the number stored in the latch means if none of the stored numbers in the storing means equal the number stored in the latch means; (4) and output means for providing an output derived from the location of the stored number which equals the number stored in the latch means.

2. A digital correlator for correlating first and second digital words, the digital correlator comprising:

first and second storing means for storing the first and second digital words, respectively;

comparing means for comparing individual bits of the first and second digital words and for producing a correlation signal each time a correlation occurs;

third storing means for storing a number indicative of the number of correlation signals of the comparing means;

control means for causing the comparing means to compare individual bits a plurality of times, each time the bits of the second digital word being shifted with respect to the bits of the first digital word so that the third storing means stores a plurality of numbers indicative of the correlation signals of each comparison; and search means for searching the stored numbers in the third storing means for the number indicating the greatest similarity between the bits of the first and second digital words and providing an output indicative of the number of bits by which the second word is displaced with respect to the first word when greatest similarity occurs, said search means including (1) latch means for storing numbers therein; (2) comparator means for comparing the number stored in the latch means with the stored numbers in said third storing means; (3) decrementing means for decrementing the number stored in the latch means if none of the stored numbers in said third storing means equal the number stored in the latch means; and (4) output means for providing an output derived from the location of the stored numbers which equals the number stored in the latch means.

* * * * *